C. J. AND L. SCHIFFERLE.
VEHICLE WHEEL.
APPLICATION FILED NOV. 29, 1918.
1,381,597.
Patented June 14, 1921.
2 SHEETS—SHEET 1.
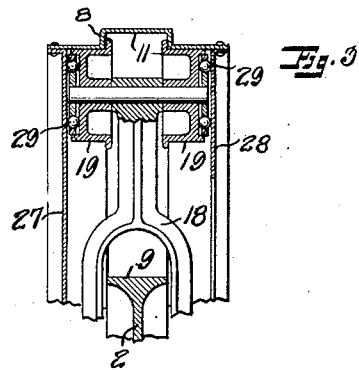
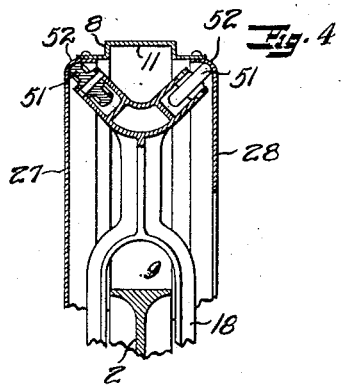
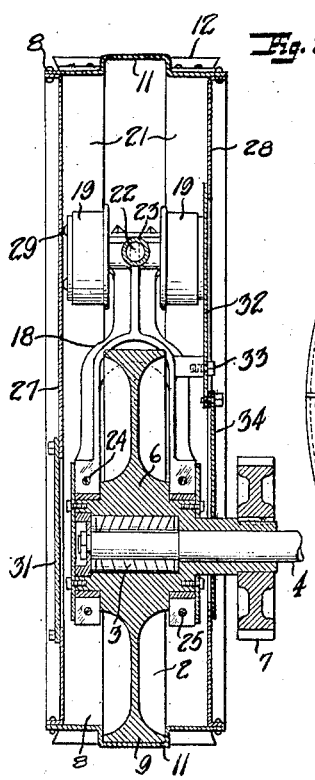
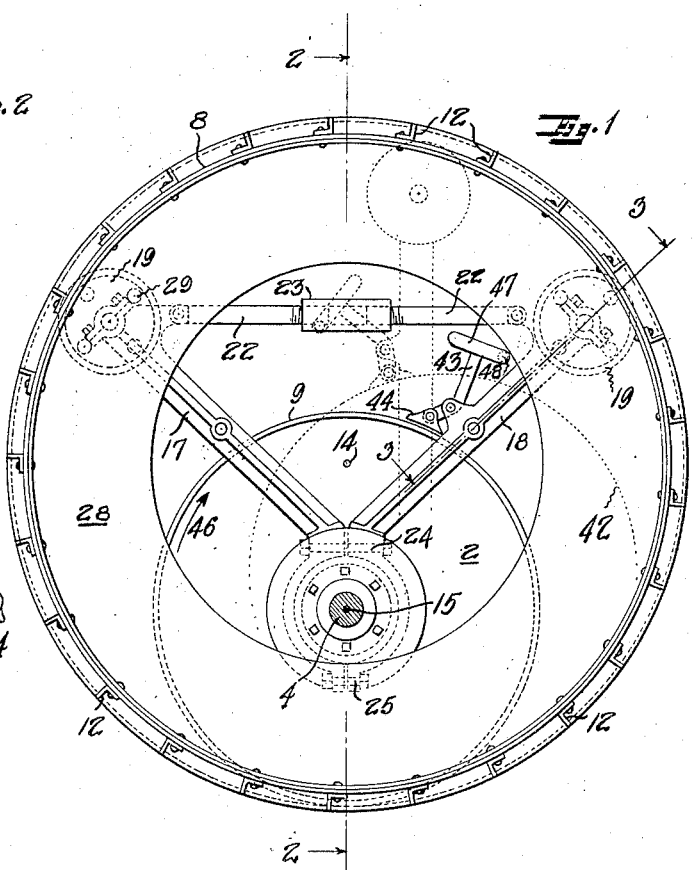
WITNESSES
INVENTORS
C.J. SCHIFFERLE
AND L. SCHIFFERLE
BY
THEIR ATTORNEYS

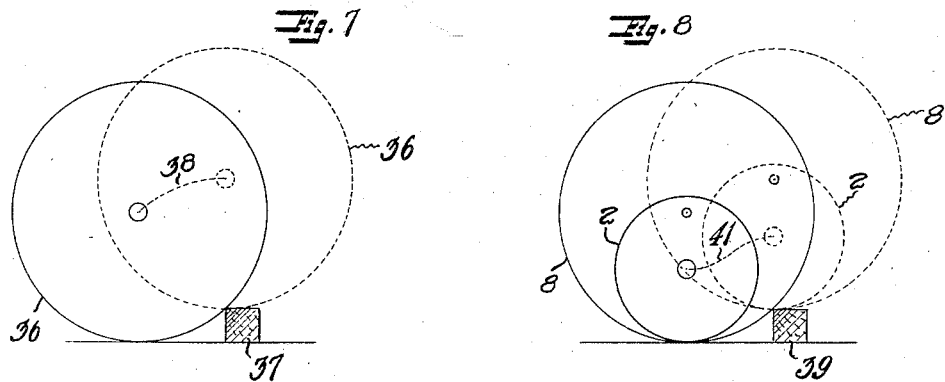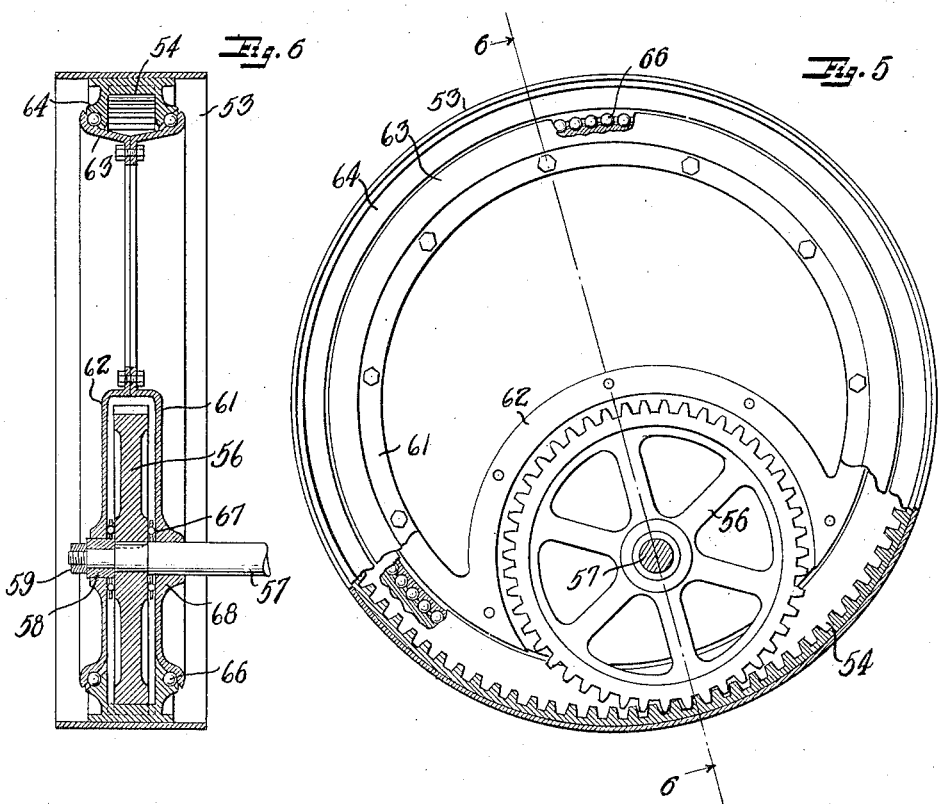

UNITED STATES PATENT OFFICE.

CHARLES J. SCHIFFERLE AND LEO SCHIFFERLE, OF BERKELEY, CALIFORNIA.

VEHICLE-WHEEL.

1,381,597.  Specification of Letters Patent.  Patented June 14, 1921.

Application filed November 29, 1918. Serial No. 264,693.

*To all whom it may concern:*

Be it known that we, CHARLES J. SCHIFFERLE and LEO SCHIFFERLE, citizens of the United States, and residents of Berkeley, county of Alameda, State of California, have invented a new and useful Vehicle-Wheel, of which the following is a specification.

Our invention relates to vehicle wheels and one of the objects of the invention is to provide a wheel which will surmount obstacles with less shock than is experienced with an ordinary wheel.

Another object of our invention is to provide a wheel structure comprising a load-bearing wheel and a continuous track therefor.

Another object of our invention is to provide an improved form of tread for a tractor wheel.

Another object of our invention is to provide a wheel structure of the class described which is completely inclosed.

The invention possesses other features of advantage, some of which, with the foregoing, will be set forth in the following description of the preferred form of our invention which is illustrated in the drawings accompanying and forming part of the specification. It is to be understood that we do not limit ourselves to the showing made by the said drawings and description, as we may adopt variations of the preferred form within the scope of our invention as set forth in the claims.

Referring to the drawings:

Figure 1 is a side elevation of the wheel structure, a portion of the housing being omitted to better disclose the structure.

Fig. 2 is a sectional view of the wheel structure, the plane of section being indicated by the line 2—2 of Fig. 1.

Fig. 3 is a sectional view of a portion of the wheel structure, the plane of section being indicated by the line 3—3 of Fig. 1.

Fig. 4 is a sectional view of a portion of a modified form of structure. The view corresponds to that shown in Fig. 3.

Fig. 5 is a side elevation of another embodiment of our invention, a portion of the housing being broken away to disclose the structure.

Fig. 6 is a sectional view of the structure shown in Fig. 5. The plane of section is indicated by the line 6—6 of that figure.

Figs. 7 and 8 are diagrammatic views illustrating the mode of operation of the wheel.

Broadly stated, our invention comprises a load-bearing wheel about which a rigid, circular rim of larger diameter is arranged. The inside of the rim provides a track in which the wheel runs, and the outside of the rim provides a ground contacting tread. The forward movement of the load-bearing wheel causes it to roll upon the inside of the rim, normally causing the rim or track to revolve about its geometric center as an axis of rotation. On a level smooth pavement this revolution of the track-rim or track is free and its rotational axis will remain substantially vertically above the rotational axis of the load-bearing wheel, but if the track encounters an obstruction so that its forward movement is interrupted or retarded, the load-bearing wheel rolls upwardly on the track until the momentum of the moving structure and the shifting of its center of gravity causes the track to mount the obstruction. In order to prevent the weight of the track from unduly retarding the mounting of an obstacle, and to avoid too extensive a movement of the wheel upwardly therein when the track is stopped or impeded, means are provided for temporarily causing the track to revolve with the wheel about the rotational axis of the latter, thus making the torque of the wheel axle effective to force the track to mount the obstacle. This means automatically becomes operative when the wheel has reached a predetermined elevation in the track.

A detailed description of several embodiments of our invention follows. Referring first to Figs. 1 and 2. A load-bearing wheel 2 is mounted on suitable roller bearings 3 upon the axle 4. The hub 6 of the wheel is extended outwardly and provided with a gear or sprocket 7 by which power may be applied to turn the wheel. Disposed about the wheel in a plane perpendicular to the rotational axis thereof is a rigid circular rim or track 8, the inside of which forms a track for the wheel 2 to run on and the outside of which forms a ground contacting tread. Preferably the wheel 2 is formed with a cylindrical, broad rim or face 9 and the track or rim is provided on the inside with an annular groove of corresponding shape so that the wheel and track form an interlocked engagement and relative lateral movement is avoided.

The outside of the track groove 11 forms a broad cylindrical relatively smooth tread sufficient to support the load carried by the structure upon a relatively hard road or street. The portions of the rim of smaller diameter on each side of the tread 11 are provided at intervals with cleats or grousers 12, the outside diameter of which is the same as or a trifle less than the diameter of the adjacent smooth tread. This tread structure, comprising both a smooth and grousered tread, enables the wheel to operate over paved roads or soft ground. On the former the tread 11 takes the load and the surface of the road is uninjured by the grousers; on the latter the tread 11 sinks into the yielding surface and the grousers 12 take hold.

Means are provided for retaining the wheel in constant engagement with the track; i. e., for retaining the rotational axes 14 and 15 of the track and wheel respectively at a constant distance apart. About the hub 6 of the wheel the bifurcated arms 17 and 18 are journaled. The ends of the arms are provided with a pair of flanged rollers 19 adapted to run upon the edges 21 of the track groove. These rollers together with the wheel 2 provide a 3-point bearing in the circular track and effectually prevent disengagement of the wheel from the track.

The arms are pivotally attached together by the links 22 connected by the turn-buckle 23 and the ends of the arms engaging the hub 6 are slightly separated and are adjustable relatively to each other by the bolts 24 and 25 so that the spread of the arms may be adjusted to give proper contact of the rollers with the track and to take up wear.

It is obvious without specific illustration and description that if desired the arms may not be bifurcated about the wheel but disposed wholly on one side thereof.

It is desired that the wheel-and-arm structure shall be wholly inclosed so that mud, water and dirt are effectually excluded and to this end a web 27 is suitably secured to the rim on the outside of the structure, and a web 28 secured to the rim on the inside. These webs stiffen the rim and also form a runway for the ball-bearings 29 arranged in the sides of the rollers 19 to take side thrust. An aperture in the outer web 27 normally covered by the plate 31 provides access to the hub structure of the wheel 2. The inner web 28 is annular in form. The upper half of the aperture in the web is closed by the semi-circular plate 32 lying on the inside of the annular web and secured to the arms 17 and 18 by cap screws 33 which pass through holes slotted sufficiently to permit the necessary adjustment of the arms. Attached to the plate 32 is a semi-circular plate 34 which lies on the outside of the annular web and through which the hub 6 and axle 4 extend.

From the structure just described it will be clear that mud and water falling against the inside face of the wheel structure are shed or deflected past the joints in the web and plates without entering the housing. It will also be clear that the plates 32 and 34 are fixed to the arms 17 and 18 and that in the operation of the wheel structure a running joint is formed between the plates and the web 28, the entire rim and housing (except plates 32 and 34) turning freely about and under the wheel 2 as it rolls along upon the inside of the rim.

When an ordinary wheel represented by the circle 36, Fig. 7, meets an obstruction 37, the center of the wheel describes an arc 38 as the wheel mounts the obstruction. This involves an abrupt change in direction of both wheel and load with consequent shock. With a track according to my invention, of the same size as the wheel 36, and represented by the circle 8, Fig. 8, and a load-bearing wheel 2 of relatively small size arranged in the track, the obstruction 39 is encountered with no shock, since no abrupt change of direction is effected in the load-bearing wheel or the load. The track is momentarily impeded, but, pausing, provides an incline to the top of the obstacle up which the load bearing wheel rolls, the center of the wheel describing the curve 41. The change of direction on both sides of the obstacle is gradual and accomplished with no shock.

As the load-bearing wheel rolls upwardly in the track when the latter momentarily pauses or is retarded before an obstruction sufficiently high to overcome the momentum of the moving structure, it will perhaps occupy the position indicated by the dotted circle 42, Fig. 1. At this time it is desirable for the track to mount the obstruction since the incline of the track is increasing sharply. Means are, therefore, provided for directly applying the torque of the axle to the track. That is, under usual conditions of road, the track revolves freely under the wheel, being retarded somewhat before slight obstacles, but owing to the momentum of the moving structure and load and the mounting of the wheel within the track, riding over ordinary obstructions. Meeting a higher obstacle the wheel runs upwardly in the track to a predetermined position and automatically, instrumentalities are thrown into operation which causes the turning force of the axle or wheel to be transferred directly to the track until it has mounted the obstruction and the parts have reassumed the usual operative position with the rotational axis of the wheel substantially under the rotational axis of the track. When this occurs the track is released from the direct application of axle torque.

Pivoted upon the arm 18 which in the forward movement of the wheel structure leads the arm 17, is a bent lever 43 to which the shoe 44 is pivoted. The shoe is normally just out of contact with the wheel rim 9, but is adapted to contact therewith and lock the wheel, which is turning in the direction of the arrow 46, Fig. 1, to the arms, when the upper and longer arm of the lever moves backwardly. The lever is of such form that the weight of the upper arm keeps the shoe free of the wheel under circumstances of ordinary road conditions, but when the track pauses before an obstacle and the wheel reaches a certain predetermined position in the track indicated by the dotted circle 42, the arm 18 turns backwardly, the heavy long arm of the lever 43 falls toward the rear and the shoe 44 locks against the wheel as indicated by the dotted lines of Fig. 1. Owing to the position of the lever and shoe in respect of the direction of motion of the wheel, such motion tends to lock the parts tightly together. The torque of the wheel and axle are now directly transferred to the arm 18 and through the roller 19 to the track tending to cause it to revolve, not about its own rotational axis 14, but the rotational axis 15 of the wheel 2. With the full turning movement of the axle exerted directly upon the track, it mounts the obstacle, and simultaneously the arm 18 moves forward and downward about the axis 15, shifting the center of gravity of the lever 43 forward of the lever pivot, and disengaging the shoe from the wheel.

Means are provided for furnishing a shock to the lever when it changes position so as to more certainly and promptly engage and disengage the shoe. The top of the lever is provided with a piece of pipe 47 closed at both ends and containing a ball 48. With the shifting of the lever due to movement of the arm 18, the impact of the ball upon the ends of the pipe adds the necessary shock to promptly engage or free the shoe from the wheel.

In Fig. 4 we have shown a variation of the roller and housing structure. In this construction rollers 51 having a rounded face are arranged at an angle to the plane of the wheel and bear against rounded corners in the side plates which are formed by the inwardly extending flanges 52 upon which the rim 8 is secured. Rollers so disposed take both radial and lateral thrust and dispense with the need for the ball bearing structure shown in Fig. 3.

In Figs. 5 and 6 we have shown another embodiment of our invention. On the inside of the rim 53 a track 54 is arranged which comprises an internal spur gear. The face of the load-bearing wheel 56 is also provided with spur teeth to mesh with the track. The wheel 56 is keyed to the shaft 57 and is retained thereon by the collar 58 secured by the nut 59.

Journaled on the axle on one side and on the collar 58 on the other side are two webs 61 and 62 which form a housing about the wheel 56 and extend outwardly toward the track where they are provided with flanges 63 in which ball races are formed. Associated ball races are formed in flanges 64 integral with the track 54 and balls 66 are disposed in the races. The flanges and ball races are so arranged that the balls take both the radial and lateral thrust of the webs 61 and 62 on the track and rim, thus keeping the wheel 56 in mesh with the track and maintaining a constant distance between the rotational axes of wheel and track. As a means of lightening the structure the webs are cut away between the housing portion about the wheel 56 and the flanges 63. Preferably also end thrust bearings 67 are interposed between the wheel hub and the hubs 68 of the webs.

The operation of this structure is somewhat different from that previously explained. On ordinary road surfaces the track revolves about and under the wheel, but with a retarding of the track, due to an obstruction, the wheel starts to climb on the track, all slippage being prevented by the toothed engagement. Of course if the obstruction were high enough to totally block forward movement of the track, continued rotation of the axle would cause the wheel to travel all the way around the track, but ordinarily the increased pressure exerted by the load upon the obstruction as the wheel moves forward and upward coupled with the increased tractive effort of the track due to the fact that the track must either turn under the wheel or the wheel and load be lifted, causes the track to crush aside or mount the obstruction.

Both Figs. 1 and 6 show a driving wheel structure. It is obvious without specific illustration that the load-bearing wheel may be mounted for rotation upon the axle, as well as with it, and that the lever and shoe structure described in connection with Fig. 1 may be omitted since that structure would be unnecessary if power were not applied to turn the wheel.

We claim:

1. A wheel structure comprising a load-bearing vehicle wheel, a rigid circular track disposed about said wheel, means pivotally arranged about the rotational axis of said wheel for maintaining the wheel in engagement with said track, friction reducing means interposed between said means and said track, and means for locking said pivotally arranged means in engagement with said wheel.

2. A wheel structure comprising a load-bearing vehicle wheel, a rigid circular track disposed about said wheel, means pivotally arranged about the rotational axis of said wheel for maintaining the wheel in engagement with said track, friction reducing means interposed between said means and said track, and means for automatically engaging and disengaging said pivotally arranged means with and from said wheel.

3. A wheel structure comprising a load-bearing wheel, a rigid circular track disposed about said wheel, means for revolving said wheel, and means engaging said wheel whereby the torque of the wheel-turning means tends to cause rotation of said track about the rotational axis of said wheel.

4. A wheel structure comprising a load-bearing wheel, a rigid circular track disposed about said wheel, and means adapted to engage said wheel whereby the turning of the wheel tends to cause rotation of said track about the rotational axis of said wheel.

5. A wheel structure comprising a load-bearing wheel, a rigid circular track disposed about said wheel, means pivotally disposed about the rotational axis of said wheel for maintaining the rotational axes of the wheel and track at a constant distance apart, and means for locking said pivotally disposed means for rotation with said wheel.

6. A wheel structure comprising a load-bearing wheel, a rigid circular track disposed about said wheel, means pivotally disposed about the rotational axis of said wheel for maintaining the rotational axes of the wheel and track at a constant distance apart, means for automatically locking said pivotally disposed means for rotation with said wheel and for automatically unlocking said pivotally disposed means.

7. A wheel structure comprising a load-bearing wheel, arms pivotally arranged about the rotational axis of said wheel, a circular track disposed about said wheel, side plates on said track, a roller engaging in the corner between the track and each side plate disposed on each arm, and means for adjusting the spread of said arms.

8. A wheel structure comprising a load-bearing wheel, arms journaled about the rotational axis of said wheel, a circular track disposed about said wheel, side plates having rounded corners and fixed on said track, and rollers arranged at an angle to the plane of said wheel disposed between said arms and said rounded corners.

9. A wheel structure comprising a load-bearing wheel, arms pivotally arranged about the rotational axis of said wheel, a circular track disposed about said wheel and arms, means on said arms providing a rolling engagement with said track, and means for automatically momentarily locking said arms to said wheel.

10. A wheel structure comprising a load-bearing wheel, a circular track disposed about said wheel, means pivotally disposed about the rotational axis of said wheel and forming a rolling contact with said track at points spaced from the contact of the wheel therewith, and means for automatically momentarily locking said pivotally disposed means for rotation with said wheel.

11. A wheel structure comprising a load-bearing wheel, a circular track disposed about said wheel, means pivotally disposed about the rotational axis of said wheel and forming a rolling contact with said track at points spaced from the contact of the wheel therewith, and gravitally operated means for momentarily locking said pivotally disposed means for rotation with said wheel.

12. A wheel structure comprising a load-bearing wheel, a circular track disposed about said wheel, means pivotally disposed about the rotational axis of said wheel and forming a rolling contact with said track at points spaced from the contact of the wheel therewith, a gravitally operated lever pivotally arranged on said pivotally disposed means, and a shoe on said lever adapted to engage said wheel.

13. A wheel structure comprising a load-bearing wheel, arms journaled upon the hub of said wheel, a circular track disposed about said wheel, side plates on said track to form therewith a closed housing for said wheel and said arms, and at their juncture with said track formed to provide rounded corners, and rollers arranged on said arms to engage said rounded corners and lying in a plane making an angle of substantially forty-five degrees to the plane of said wheel.

14. A wheel structure comprising a load-bearing wheel, a circular track disposed about said wheel, means pivotally disposed about the rotational axis of said wheel and forming a rolling contact with said track whereby the axes of rotation of said wheel and track are maintained at a constant distance apart, a circular plate closing one side of said track, an annular plate partially closing the other side of said track, and a circular plate fixed to said pivotally disposed means for closing the aperture in said annular plate.

15. A wheel structure comprising a load-bearing wheel, a circular rim disposed about said wheel, said rim being formed with a wide annular bead providing on the inside of the rim a groove in which said load-bearing wheel is adapted to track and on the outside of the rim a substantially smooth tread, and grousers arranged on said rim adjacent the bead, the bead and grousers being of substantially the same diameter.

In testimony whereof, we have hereunto set our hands at San Francisco, California, this thirteenth day of November, 1918.

CHARLES J. SCHIFFERLE.
LEO SCHIFFERLE.